Patented Mar. 20, 1945

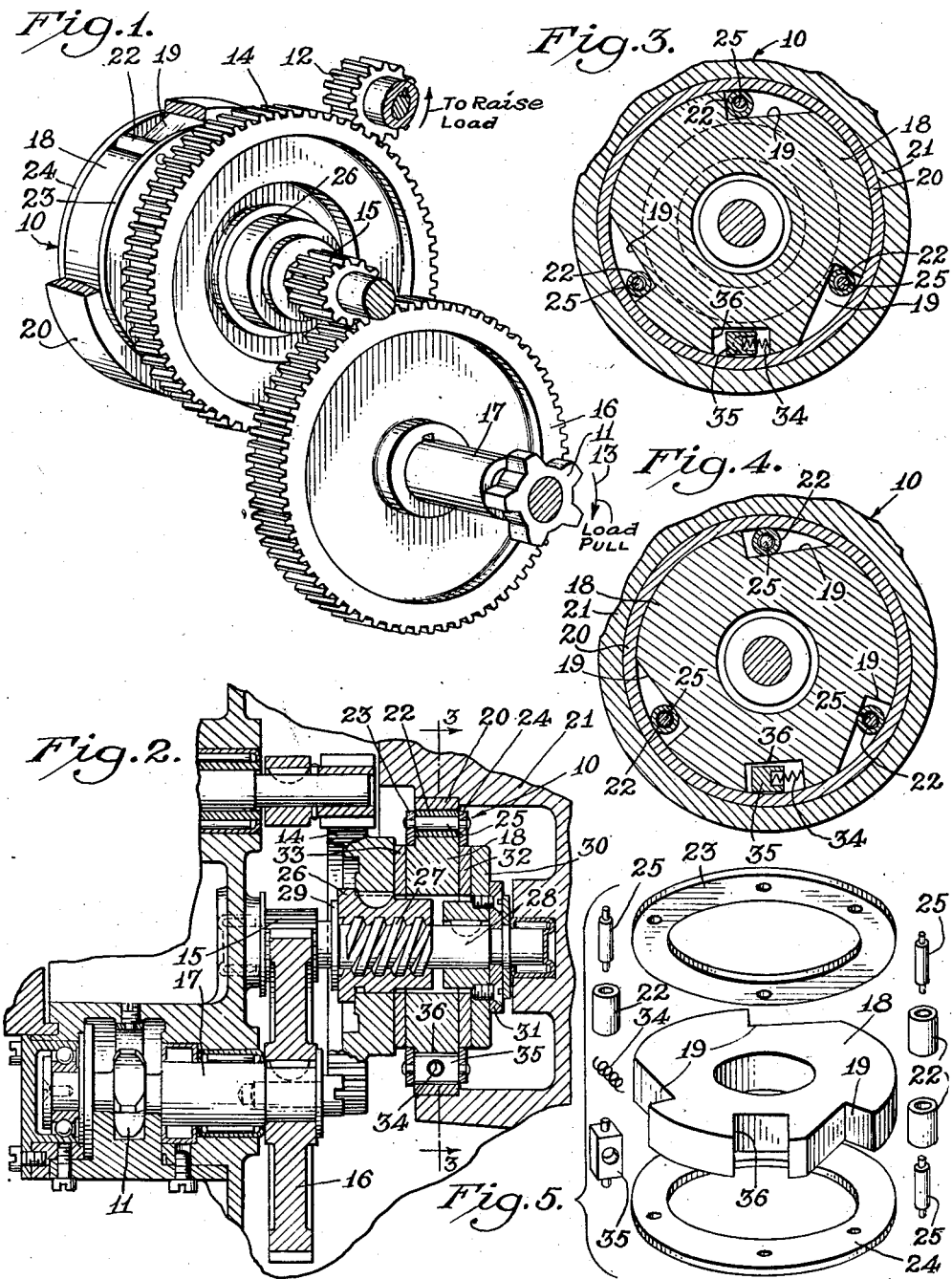

2,372,026

UNITED STATES PATENT OFFICE 2,372,026

HOIST LOAD BRAKE

Ralph E. Smith, Muskegon Heights, Mich., assignor to Manning, Maxwell & Moore, Inc., Muskegon, Mich., a corporation of New Jersey Application March 6, 1942, Serial No. 433,609

1 Claim. (Cl. 188—82)

The invention pertains to improvements in load brakes for hoists and roller ratchet mechanisms of a type particularly suited for use therein.

One general object of the present invention is to provide a roller ratchet mechanism, suitable for use in a hoist load brake or the like, having an extremely long life under conditions of even severe usage.

More particularly it is an object of the invention to provide such a brake in which provision is made for automatically compelling a substantially uniform distribution of the braking load throughout a series of rollers so that individual ones of them will not be injured by having a disproportionate portion of the load inadvertently applied to them.

Another object is to provide a novel roller ratchet mechanism in which a simple and highly effective spring arrangement is provided for yieldably biasing the ratchet rollers in such manner as to insure positive and rapid action without jamming though permitting a wide latitude of tolerance in the dimensioning of the pockets which receive the rollers.

Still another object is to provide a novel roller ratchet mechanism which is extremely simple to assemble and adjust even though it includes a spring biasing arrangement for insuring rapid and positive operation.

The invention also resides in various structural improvements and correlations of the parts by means of which the desired ruggedness and strength of construction are combined with low cost, simplicity and reliability of operation.

Further objects and advantages of the invention will become apparent as the following description proceeds, taken in connection with the accompanying drawing in which:

Figure 1 is a perspective view of a brake mechanism embodying the invention, together with the associated gear elements for a hoist installation, the stationary ring of the brake being partially broken away to expose the interior arrangement.

Fig. 2 is a vertical longitudinal sectional view of the apparatus shown in Fig. 1.

Figs. 3 and 4 are transverse sectional views taken substantially along the line 3—3 in Fig. 2, and showing the brake elements respectively in disengaged and engaged positions.

Fig. 5 is an exploded perspective view of the elements of the brake mechanism.

While the invention is susceptible of various modifications and alternative constructions, I have shown in the drawing and will herein describe in detail the preferred embodiment, but it is to be understood that I do not thereby intend to limit the invention to the specific form disclosed but intend to cover all modifications and alternative constructions falling within the spirit and scope of the invention as expressed in the appended claim.

The brake herein illustrated is a so-called "load brake" for use in an electric hoist. For a description of a complete hoist, in which a "load brake" of the class referred to above is commonly used, reference may be made to Frank J. Winterer Patent No. 1,628,212, issued May 10, 1927, the load brake of the hoist shown in that patent being comprised of parts designated 14, 22 and 23. For present purposes it is sufficient to note that the herein disclosed brake mechanism 10 is shown (see Figs. 1 and 2) as arranged to perform two functions, first, to hold a revoluble hoisting member (shown as a sprocket 11) against rotation when a drive motor (not shown), connected to a drive pinion 12, is shut off; and second, to limit the speed of sprocket rotation when a load is being lowered.

In a hoist installation like that indicated, a chain, of, for example, the roller type, is led over the sprocket 11 and a load is attached to one end of the chain so that it exerts a gravity pull in the direction of the arrow 13 in Fig. 1, thus tending to revolve the sprocket clockwise. To raise the load, the drive pinion 12 is driven to turn in a counterclockwise direction. This pinion meshes with a gear 14, connected to a coaxial pinion 15 (by connection hereinafter detailed) which in turn meshes with a gear 16 rigid with a shaft 17 which carries the sprocket 11. Thus, when the drive pinion 12 is turned counterclockwise it revolves the gear 14 clockwise, as well as the pinion 15, and the latter pinion turns the gear 16 counterclockwise so that the sprocket 11 also turns counterclockwise to raise the load. Similarly, to lower the load, the drive pinion 12 is driven in the opposite or clockwise direction so that the loaded sprocket 11 will turn in a clockwise direction.

As noted above, the brake mechanism serves to hold the sprocket 11 against turning when the drive motor is at rest and to limit the speed of descent of the load during lowering of the same. For this purpose the brake 10 is constructed in the manner of what might be termed a torque-differential-responsive device. In other words, its braking force is applied in accordance with the amount, if any, by which the load torque on the sprocket 11 exceeds the driving torque of the motor. Hence, when the drive motor is shut off, and thus applying no torque to the drive pinion 12, the torque resulting from the gravity pull of the load on the sprocket 11 preponderates and causes the brake to be applied. During the descent of the load, the brake is partially applied by an amount depending upon the ratio of the torque exerted by the load to that exerted by the motor, but during hoisting the brake is entirely released.

Turning now to the details of the illustrated brake mechanism, it comprises a roller ratchet embodying a revoluble cage 18 in the form of a heavy cast metal disk having a plurality (here shown as three) of peripheral pockets or notches 19 therein at points spaced equidistantly, circumferentially of the disk. This cage is encircled by a stationary member or ring 20 rigidly fixed in a frame 21 of the hoist. In each of the pockets 19 is a transversely extending roller 22. The bottom walls of the pockets 19 are fairly steeply inclined outward toward the stationary ring 20, in a direction circumferential of the cage 18. If the cage 18 is turned in a counterclockwise direction (as viewed in Figs. 1, 3 and 4) the rollers 22 have some tendency to ride up along the inclined bottom walls of the pockets 19 (i. e., move from the position of Fig. 3 to that of Fig. 4), and upon effectuation of such movement they jam tightly between the pocket bottom walls and the opposed face of the stationary ring 20, thus locking the cage 18 securely against further turning in a counterclockwise direction. Upon turning of the cage 18 in the opposite or clockwise direction, however, the rollers 22 move down to the lower ends of the pockets 19, thus freeing the cage from the stationary ring 20 so that the cage can turn freely.

If the rollers are movable independently of each other circumferentially of the cage, there is danger of one or two of the rollers carrying substantially all of the load. Thus, due to sticking of some one or more of the rollers in the lower ends of the pockets, or for other reasons, it might, and frequently does, happen that only one or two of them become properly jammed in the narrow ends of their pockets to effect braking. This results in unequal wear on the rollers, likelihood of their breakage due to overloading of certain of them, and slippage of the brake. Such unreliable operation is, of course, undesirable.

To avoid the difficulties noted above and to compel uniform loading of the whole series of rollers, a special carrier or mounting has been provided for them so that they will always move in unison, in a direction circumferential of the cage 18, that is, into and out of braking position. For this purpose two carrier rings 23 and 24 are provided (Figs. 2 and 5), joined by a series of pins 25 on which the respective rollers 22 are journaled, the pins extending through longitudinal bores in the rollers. To fix the pins to the carrier rings, the pins are fashioned with reduced end portions, which are inserted through registering holes in the rings and the outer ends of the pins peened over. The carrier assembly thus comprised of the rings or side members 23, 24 and pins 25 is oscillatable relative to the cage about the axis of the latter. The ring 23 encircles a reduced end portion of the cage (see Fig. 2).

As the carrier assembly 23—24 oscillates relative to the cage 18, the rollers, on the carrier moving along the inclined bottom walls of the pockets 19, are displaced radially outward from the center of the cage as they roll upward along the inclined pocket bottoms. To accommodate such radial displacement of the rollers, a sufficient clearance for the purpose is provided between the rollers 22 and the pins 25 through which they are journaled. A clearance of the order of two-thousandths of an inch has been found to be suitable in the particular device illustrated.

The mounting described for the rollers serves, in effect, to tie together the whole series of rollers so that they always move in unison circumferentially of the cage and share the braking load substantially equally. In this way each individual one of the rollers is protected against overloading or breakage and the life of the device substantially increased.

Coordinated with the carrier type mounting described above for the rollers is a novel arrangement for insuring positive and rapid action of the roller ratchet mechanism under all conditions of operation. This arrangement comprises biasing means for yieldably urging the carrier and cage to turn relative to each other in a direction to move the rollers into their jammed or locking position. In this way it is possible to use bottom walls in the pockets 19 which are so steeply inclined as to assure instant and complete freeing of the rollers from the surrounding member 21 when the cage is turned in the unlocking direction, and yet the biasing means will insure movement of the rollers back into full locking position, upon rotation of the cage in the proper direction, despite such steepness of incline.

In the illustrative device the biasing means noted above comprises a compression spring 34. This spring is interposed between a block or projection 35 (rigidly fixed between the carrier rings 23—24) and a side wall of an additional peripheral pocket 36 in the cage 18. Upon reference to Figs. 3 and 4 it will be seen that the spring 34 tends to revolve the cage 18 counterclockwise relative to the carrier, that is to say, in a direction such as to shift the rollers into jammed position at the small ends of their pockets 19.

It is to be particularly noted that due to the mounting of the rollers in a carrier a single spring serves to bias, simultaneously, all of the several rollers 22. Thus, the carrier type mounting for the rollers aids in making possible such a simple and easily adjusted biasing means for all of a plurality of rollers in addition to assuring uniform distribution of the load thereon. Ease of adjustment and assembly of the ratchet mechanism are of importance in minimizing the cost of the device, and it will be readily appreciated that the insertion and adjustment of a single spring is far simpler than setting up and attempting to equalize a whole series of springs for a corresponding number of independently movable rollers. The provision of a spring bias for the rollers, as described, not only makes it possible to use desirably steeply inclined pockets, but also permits of a fairly wide tolerance in the accuracy with which such pockets are formed. Thus, even though the pockets are not all uniformly sloped, the interconnection of the rollers and spring bias applied to them will insure simultaneous movement of the same without sticking or binding.

As a means of actuating the cage 18 to apply braking force during the operation of the hoist in accordance with the program outlined at the outset above, a nut 26 is keyed to the gear 14 and threaded on a screw 27 (Fig. 2). This screw 27 is formed on a shaft 28 rigid with the pinion 15. An abutment collar 29, rigid with the shaft 28, limits the travel of the nut 26 to the left (as viewed in Fig. 2). Keyed to the righthand end of the shaft 28 is a flanged bushing 30. To limit the inward movement of the bushing 30, a split collar 31, seated in a groove in the shaft 28, is screwed to the bushing. A friction washer 32, of asbestos or the like, is interposed between the flange on the bushing 30 and the outer face of the cage 18. Similarly, a second friction washer 33 is interposed between the other face of the cage and the opposed face of the gear 14. The screw 27 has a righthand thread.

When the load on the sprocket 11 turns the pinion 15 counterclockwise, the nut 26 is threaded along the screw 27 to the right (as viewed in Fig. 2). The nut carries with it the gear 14 so that the cage 18 is squeezed between the opposed faces of the bushing 30 and gear 14, being thereupon frictionally connected to these parts through the washers 32, 33 so that the cage is thus effectually connected to, and turns with, the gear 14. The latter gear, like the pinion 15, is being turned counterclockwise by the load on the sprocket so that the cage 18 is also turned counterclockwise, upon being connected to the gear 14 as described. Consequently, the rollers 22 are shifted into their jammed or locking position. In this way the cage 18, gear 14, pinion 15 and sprocket 11 are all, in effect, locked to the stationary ring 20 so that the load is held against descent.

Turning of the gear 14 in an opposite or clockwise direction causes the nut 26 to be shifted axially outward along the screw 27, thus disconnecting the cage 18 from the gear 14 so that the latter can turn without interference from the brake, as for example, during the hoisting of the load. During such hoisting operation the nut 26 is jammed solidly against the stop collar 29 at the outer end of the screw to connect the gear 14 to the pinion 15.

During lowering of the load any tendency of the load to overpower the motor applies the brake. Thus if the load is great, so that its torque exceeds that of the motor, it will tend to thread the nut 26 along the screw to apply the brake just as in the case of a hanging load with the motor shut off as described above. The amount of brake application, however, depends upon how tightly the cage 18 is clamped to the gear 14, and this, in turn, depends upon how much the load causes the screw 27 to turn relative to the nut 26. The nut and screw tend to be turned, respectively, by the motor and load and in the same direction. Consequently, relative axial movement of them to partially apply the brake, to slow down the load's descent, only occurs when the load tends to cause the pinion 15 to turn faster than the gear 14.

The present application is a continuation-in-part of my prior application, Serial No. 401,217, filed July 5, 1941, now abandoned.

I claim as my invention:

In a roller ratchet mechanism, the combination of a cage comprising a metal disk having a plurality of peripheral pockets therein spaced generally equidistantly circumferentially of the cage, the bottom wall of each pocket being steeply inclined radially outward toward the periphery of the disk, an annular member encircling the periphery of said disk, a plurality of rollers, one in each pocket, disposed to extend transversely of the disk in such pockets for rolling movement along said pocket bottom walls from a first position at the upper ends of said walls in which the rollers are jammed against said annular member to a second position at the lower ends of said walls in which the rollers are freed of said annular member, a carrier comprising a pair of side members disposed on opposite sides of said disk, means revolubly supporting said rollers between said carrier side members, said cage having an additional peripheral pocket therein, a projection rigid with said carrier and extending into said additional pocket, and a compression spring interposed between said projection and a wall of said additional pocket in position to urge said cage and carrier to turn relative to each other in a direction to shift said rollers into said first position.

RALPH E. SMITH.